United States Patent Office 2,906,720
Patented Sept. 29, 1959

2,906,720
COMPOSITION COMPRISING AROMATIC PETROLEUM RESIDUE AND POLYEPOXIDE AND PROCESS FOR TREATING SURFACES THEREWITH

Warren C. Simpson, Berkeley, Calif., assignor to Shell Development Company, New York, N.Y., a corporation of Delaware No Drawing. Application April 24, 1957
Serial No. 654,665

18 Claims. (Cl. 260—28)

This invention relates to new compositions of matter which are particularly suited for use as surfacing compositions. More particularly, the invention relates to new compositions containing certain petroleum residues which are especially suited for use as surfacing compositions for concrete, asphalt, wood and steel.

Specifically, the invention provides new and particularly useful compositions comprising a mixture of a homogeneous single phase highly aromatic petroleum residue having a precipitation index between 50 and 100 and a polyepoxide possessing more than one vic-epoxy group, and preferably a polyglycidyl ether of a polyhydric phenol. The invention further provides a method for using these compositions as surfacing materials for concrete, asphalt, wood and steel surfaces.

There is a growing need for a cheap surfacing composition that can be applied to concrete and asphalt road or storage areas to help reduce the destruction of the surface due to wear, rain, deicing salts and cold weather. In the case of asphalt surfaces, there is also a need for coatings which would improve resistance to heat and solvents. This is particularly urgent in the case of asphalt runways for jet aircraft as the heat and jet fuels readily attack asphalt surfaces. Further, concrete and asphalt road surfaces and exposed metal on bridge roadways, etc., tend to develop dangerously smooth surfaces due to wear which cause skidding when wet and there is a great need for a non-skid coating that will adhere to these surfaces.

Various compositions have been suggested for the above purposes, but the compositions suggested heretofore have not provide very satisfactory. In most cases, the coatings fail to have the necessary adhesion to the concrete, asphalt and metal surfaces, particularly if they are the least oily or dirty. In other cases, the coatings fail to stand up under inclement weather conditions. In still other cases, the coatings fail to have the necessary resistance to solvents and heat or fail to have good wear and non-skid properties. In still other cases, the coatings are too expensive or too difficult to apply.

It is an object of the invention, therefore, to provide new compositions which are suitable for use as surfacing compositions. It is a further object to provide new compositions which when cured have excellent adhesion to concrete, asphalt, wood and metal surfaces. It is a further object to provide new compositions which form coatings for concrete, asphalt, wood and metal having excellent resistance to wear, rain and cold weather. It is still a further object to provide new surfacing compositions which form films having good resistance to solvents, heat and deicing salts. It is a further object to provide new surfacing compositions which have excellent skid resistance. It is a further object to provide new coatings which are relatively inexpensive and can be easily applied to new and old surfaces. Other objects and advantages of the invention will be apparent from the following detailed description thereof.

It has now been discovered that these and other objects may be accomplished by the compositions of the invention comprising a mixture of a homogeneous single phase highly aromatic petroleum residue having a precipitation index between 50 and 100 and a polyepoxide possessing more than one vic-epoxy group, and preferably a polyglycidyl ether of a polyhydric phenol. It has been found that these mixtures form compatible films and coatings which when cured have excellent adhesion to concrete, asphalt, wood and metal surfaces. In addition, the coatings are very hard and tough and have good resistance to outdoor weather conditions. The coatings also display good resistance to solvents and heat. When small inert particles are added to the coating, the compositions have excellent resistance to skidding. The coatings are particularly attractive for use on highways and runways as they can be easily applied to large areas and set up quickly without the use of any special curing conditions. These compositions have been found to be useful not only for the treatment of highways and road surfaces, but are equally valuable for the treatment of dock areas, warehouse floors, sidewalks, tennis courts, ship decks and the like where wear and weather resistant properties are desired.

It was quite unexpected that the above-noted mixtures would be useful for these applications because petroleum alphaltic materials, such as straight run asphalts, have been found heretofore to be incompatible with glycidyl ethers. The special type of petroleum residue used in the present invention, as noted below, however, have an unexpectedly high degree of compatibility with the polyepoxides, and in addition, their mixture with the polyepoxides form coatings having properties not possessed by coatings prepared from either the special petroleum residues alone or the polyepoxides by themselves.

The special petroleum products used in preparing the compositions of the invention comprise the homogeneous single phase highly aromatic petroleum residue having a precipitation index between 50 and 100.

The precipitation index of a petroleum residue is a simple and useful means of stating the solubility characteristics of the residue. Determination of the precipitation index consists of preparing a 10% solution of the residue in alpha-methylnaphthalene and titrating this solution with n-hexadecane to the point at which precipitation occurs. The occurrence of precipitation is easily detected by placing a small drop of the solution on filter paper periodically during the titration. A definite dark ring of precipitated material will clearly indicate the points of precipitation. The volume percent of alpha-methylnaphthalene in the solution at the point of precipitation is designated as the precipitation index. Highly aromatic petroleum residues tend to precipitate from solution in alpha-methylnaphthalene with the addition of only a small amount of n-hexadecane and hence such materials will have a high precipitation index. Residues whose aromatic constituents have appreciable numbers of alkyl side chains and naphthenic rings as substituents will remain in solution even when relatively large amounts of n-hexadecane are added and hence will have a low precipitation index. Most virgin crude oil residues have precipitation index values in the range of 20–40, the exact value depending on the hydrocarbon type composition of the crude.

In the course of refining of petroleum, the application of various processes leads to changes in the chemical constitution and hence to the solubility characteristics of various residues and other high boiling fractions. Thermal cracking of petroleum residues for the production of distillate fractions generally raises the precipitation index of the residue from the 20–40 range to the 40–70 range, the exact increase in precipitation index being closely related to the severity of thermal cracking. Catalytic cracking of distillate oils leaves high boiling catalytically cracked gas oils whose highest boiling components may have precipitation indexes in the range 60–80. The high boiling portions of coking cycle stocks also have precipitation indexes in the range 60–80. When residual fuel oils from petroleum are pyrolyzed for the production of gas in the oil-gas process, the residues remaining have a precipitation index in the range 80–95.

It has now been found that the incompatibility which was previously considered to be characteristic of polyepoxides and petroleum fractions is no longer encountered when the petroleum fraction is characterized by a precipitation index between 50 and 100. Thus when the petroleum fraction is chosen by this criterion it proves to be possible to produce a wide variety of products in which the petroleum fraction may be one or more of the following:

(1) Thermally cracked residues
(2) High boiling fractions of catalytically cracked gas oil
(3) Residue from thermal cracking of catalytically cracked gas oil
(4) High boiling fractions of coking cycle stock
(5) Residues from pyrolysis of residual petroleum fuel oils used in the production of gas.

Highly aromatic materials obtained as residues from the distillation of catalytically cracked gas oil, or clarified oil are particularly preferred.

Especially preferred are the highly aromatic petroleum residues having a precipitation index of 50–80.

The polyepoxides to be used in preparing the compositions of the invention comprise those materials possessing more than one vicinal-epoxy group, i.e. more than one

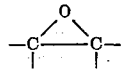

group. These compounds may be saturated or unsaturated, aliphatic, cycloaliphatic, aromatic or heterocyclic and may be substituted with substituents, such as chlorine, hydroxyl group, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.) polyglycidyl ether of 1,1,5,5-tetrakis(hydroxyphenyl)pentane (epoxy value 0.514 eq./100 g.) and the like and mixtures thereof.

The compositions of the invention may be prepared by any suitable method. The compositions may be prepared, for example, by simply mixing the components together with or without the application of heat. If one or more of the components are very thick liquids or solids, it is generally preferred to heat them before or during the mixing. Various solvents or diluents which will evaporate before or during cure may be added to assist in the preparation of the mixture, but the addition of these materials is not generally desirable as it usually lengthens the time of cure of the finished product. Suitable solvents include hydrocarbons, such as xylene, benzene, and the like. It is also convenient in some cases where employing solid polyepoxides to employ some or all liquid polyepoxides, such as normally liquid glycidyl polyethers of polyhydric alcohols, as the diluent.

The ratio of the petroleum residue and the polyepoxide in the composition may vary depending upon the properties desired in the resulting product. Compositions having the above-described unexpected properties, such as good compatibility, excellent adhesion and superior coating properties, are obtained when the polyepoxide makes up at least 5% and preferably 15% to 85% by weight the mixture of petroleum residue and polyepoxide.

An especially preferred type of composition covered by the present invention include those wherein small inert solid particles are used to give the coating excellent skid resistance. The particles should be rather finely divided and preferably have a mesh size varying from 20 to 300. Preferred materials include sand, finely divided rocks, finely divided shells, crushed quartz, aluminum oxide, finely divided resinous particles, and the like. Particularly preferred are the minerals, and especially the siliceous materials, such as, for example, sand and ground rock. Mixtures of various types of particles may also be used.

The amount of the inert particles to be added to the composition in forming the non-skid coatings should be at least 50% by weight of the total mixture of petroleum residue and polyepoxide and should preferably be between 70% to 500% by weight of the mixture.

The inert particles may be added to the composition before it is applied to the desired surface, or the petroleum residue-polyepoxide mixture may be first applied to the surface and then the inert particles placed in the coating so that they become imbedded in the mixture. Thus, in coating highway surfaces, the petroleum residue-polyepoxide mixture may be applied directly to the road surface and then the inert particles, such as sand, may then be sprinkled onto the coating before it is cured.

The composition of the invention is cured by the action of a curing agent. For this purpose, epoxy curing agents, which may be acidic, neutral or alkaline, are added. Examples of the curing agents, include among others, alkalies like sodium or potassium hydroxides; alkali phenoxides like sodium phenoxide; carboxylic acids or anhydrides, such as formic acid, oxalic acid or phthalic anhydride; dimer or trimer acids derived from unsaturated fatty acids, 1,20-eicosanedioic acid, and the like. Friedel-Crafts metal halides like aluminum chloride, zinc chloride, ferric chloride; salts, such as zinc fluoborate, magnesium perchlorate and zinc fluosilicate; phosphoric acid and partial esters thereof including n-butyl orthophosphate, diethyl ortho-phosphate and hexaethyl tetraphosphate; amino compounds, such as, for example, diethylene triamine, triethylene triamine, dicyandiamide, melamine, pyridine, cyclohexylamine, benzyldimethylamine, benzylamine, diethylaniline, triethanolamine, piperidine, tetramethylpiperazine, N,N,-dibutyl-1,3-propane diamine, N,N-diethyl-1,3-propane diamine, 1,2-diamino-2-methylpropane, 2,3-diamino-2-methylbutane, 2,4-diamino-2-methylpentane, 2,4-diamino-2,6-dimethyloctane, dibutylamine, dioctylamine, dinonylamine, distearylamine, diallylamine, dicyclohexylamine, methylethylamine, ethylcyclohexylamine, o - tolylnaphthylamine, pyrrolidine, 2-methyl-pyrrolidine, tetrahydropyridine, 2-methyl-piperidine, 2,6-dimethyl-piperidine, diaminopyridine, tetramethylpentane, meta-phenylene diamine, and the like, and soluble adducts of amines and polyepoxides and their salts, such as described in U. S. 2,651,589 and U. S. 2,640,037.

Preferred curing agents are the polycarboxylic acid anhydrides, the primary and secondary aliphatic, cycloaliphatic and aromatic amines and adducts of the amines and polyepoxides.

The amount of the curing agent employed will vary depending upon the type of agent selected. In general, the amount of the curing agent will vary from about 0.5% to 200% by weight of the polyepoxide. The tertiary amines and BF₃ complexes are preferably employed in amounts varying from about 0.5% to 20% and the metal salts are preferably employed in amounts varying from about 1% to 15%. The secondary and primary amines, acids and anhydrides are preferably employed in at least stoichiometric amounts, i. e., sufficient amount to furnish one amine hydrogen or one carboxyl group or anhydride group for every epoxy group, and more preferably stoichiometric ratios varying from 1:1 to 1:1.5.

The curing agents may be added to the compositions at any time. It is generally preferred to prepare the petroleum residue-polyepoxide compositions and the curing agents as separate packages and then mix the two just before application to the desired surface. The curing agent may also be sprayed or otherwise applied to the coating of the petroleum residue-polyepoxide mixture after it has been applied to the desired surface, but this procedure is less preferred. It is possible also to add the curing agent to the petroleum residue before combining with the polyepoxide.

The compositions of the invention may be applied to any surface but are particularly suitable for use as surfacing compositions for concrete, asphalt, wood and steel. The concrete may be of any of the usual types such as may be prepared from hydraulic cements, such as Portland cement and other types as aluminous and oxy salt type cements. The asphalt surfaces may be those prepared from straight run asphalts or further refined or modified asphalts. The compositions may be applied in very thin coatings or in very thick coatings. The application to the surface can be accomplished in any suitable manner. If material is thick or contains large amount of inert particles, the material may best be applied by use of a screed, trowel, shovel or broom. If it is of a more fluid nature, it may be applied by brushing or spraying. The coatings will generally vary in thickness from about 1/16 inch to about 1/4 inch.

The following examples illustrate the present invention. Unless otherwise specified, parts disclosed in the examples are parts by weight. Polyether resins described in the examples by letters are those described in U. S. 2,633,458. The concrete used in the examples was prepared from hydraulic cement (Portland cement), aggregate containing sand and water.

Example I

This example illustrates the preparation and some of the properties of a composition containing Polyether A and a residue from distillation of cat. cracked gas oil having a softening point of 162° F., a precipitation index of 71.5 and penetration at 77° F.

About 100 parts of Polyether A were combined with 50 parts of the petroleum residue noted above and 6 parts of diethylene triamine.

This mixture was spread on sections of asphalt roadway to form a coating of about 1/16 inch thick. In a short period at atmospheric temperature, the composition set up to form a homogeneous hard tough solvent resistant coating that had good adhesion to the asphalt.

To test the resistance of the coating to solvents, jet fuel was sprayed twice a day on the coating. No change was noted in the condition of the pavement even after 6 weeks. During a similar period of use and treatment, the unmodified asphalt road softened and commenced to disintegrate.

Metallic panels (steel and aluminum) and concrete panels coated with the above mixture also remained undamaged by jet fuels as well as undamaged in standard rain and sunshine weatherometer testing after 36 cycles. Similar results are obtained with coatings on asphalt panels. Unmodified asphalt panels show signs of disintegration or deterioration after 2 cycles under the same conditions.

Similar results are obtained by varying the ratio of Polyether A and the petroleum residue from 2:1 to 1.5:1, 1:1 and .9:1.

Related results are also obtained by replacing the diethylene triamine in the above process with equivalent amounts of each of the following: ethylene triamine, adduct of ethylene oxide and diethylene triamine, tetraethylene pentamine, and pentamethylene hexamine.

Example II 60 parts of Polyether B defined in U.S. 2,633,458 and 40 parts of the highly aromatic petroleum residue defined in Example I are combined with 12 parts per 100 parts of the above mixture of triethylene tetramine and the mixture spread on smooth concrete at a rate of about 1 pound per square yard. Before the hardening was complete, 30 mesh aluminum oxide was strewn over the surface. When curing is complete, the excess aluminum oxide is removed leaving a rough textured, though even, surface on the concrete. This coating showed little effect of wear after six weeks on a busy highway in the Eastern United States.

Example III

This example illustrates the formation of a thick roadway surfacing.

A mixture composed of equal parts by weight of Polyether A and the aromatic residue defined in Example I were combined with 12 parts of diethylene triamine and this mixture combined with an equal weight of crushed quartz. When the mixture was complete, the composition was applied at a rate of 10 pounds per square yard on a concrete surface with screeds and/or trowels. After an even layer was applied, additional crushed quartz was sprinkled over the surface and rolled with a lawn roller to gain greater compaction. After hardening was complete, the excess grit was swept off. This material was applied to busy highways in the Eastern United States and has shown no sign of wear after six months.

Example IV

This example illustrates the preparation and some of the properties of a composition containing Polyether A and a thermally cracked residue having a softening point of 150° F., a precipitation index of 71.5 and a penetration at 77° F. of 8.

About 100 parts of Polyether A were combined with 100 parts of the petroleum residue noted above and 6 parts of diethylene triamine.

This mixture was spread on sections of asphalt roadway to form a coating of about 1/16 inch thick. In a short period at atmospheric temperature, the composition set up to form a homogeneous hard tough solvent resistant coating that had good adhesion to the asphalt. The coating remained unchanged after being treated with jet fuel as shown in Example I.

A similar coating was applied to concrete roadway and 30 mesh aluminum oxide was strewn over the surface before it had set hard. The cured coating was very hard and skid resistant and displayed good resistance to solvents.

Example V

This example illustrates the preparation and some of the properties of a composition containing Polyether A and a petroleum residue comprising an oil-gas pitch having a softening point of 330° F., a precipitation index of 91 and a penetration at 77° F. of 0.

60 parts of Polyether A was combined with 40 parts of the petroleum residue noted above and 6 parts of diethylene triamine. This mixture was spread on sections of asphalt roadway to form a coating of about 1/16 inch thick. In a short period at atmospheric temperature, the composition set up to form a homogeneous hard tough coating which had good adhesion to the asphalt roadway and had good solvent resistance. The coating remained unchanged when treated with jet fuels as shown in Example I.

Related results are obtained by replacing Polyether A in the above process with equal amounts of each of the following: Polyether B, poly(allyl glycidyl ether) having a molecular weight of about 450, diglycidyl ether of resorcinol and diglycidyl ether of 2,2-bis(3-hydroxyphenyl) butane.

*Example VI*

This example illustrates the preparation and some of the properties of a composition containing Polyether A and a high boiling fraction of coking cycle stock (coking a mid continent vacuum flasher bottoms) having a precipitation index of 75, viscosity SSU at 77° F. of 5000, initial boiling point of 658° F., molecular weight about 250.

60 parts of Polyether A is combined with 40 parts of the high boiling fraction noted above and 6 parts of diethylene triamine. This mixture is spread on sections of asphalt roadway to form a coating of about 1/16 inch thick. In a short period at atmospheric temperature, the composition sets up to form a homogeneous hard tough coating which has good adhesion to the asphalt roadway and has good solvent resistance. The coating has good resistance to jet fuel.

Related results are obtained by replacing Polyether A in the above process with equal amounts of each of the following: Polyether A, diglycidyl ether of resorcinol and the diglycidyl ether of 2,2-bis(4-hydroxyphenyl)butane.

It should be noted that phenolic pitches as well as coal tar pitches are not included in the present invention as they are two phase systems and have precipitation indexes about 100.

The invention claimed is:

1. A composition comprising a mixture of a homogeneous single phase highly aromatic petroleum residue having a precipitation index between 50 and 100 and a glycidyl polyether of a polyhydric phenol having an epoxy equivalency greater than one wherein "precipitation index" refers to the volume percent of alpha-methyl naphthalene in solution after titration of a 10% solution of the said petroleum residue in alpha-methyl naphthalene with n-hexadecane until precipitation occurs.

2. A composition as in claim 1 wherein the polyepoxide is a glycidyl polyether of 2,2-bis(4-hydroxyphenyl)propane having an epoxy equivalency between 1.0 and 3 and a molecular weight between 250 and 900.

3. A composition as in claim 1 wherein the highly aromatic petroleum residue is high boiling fraction of catalytically cracked gas oil.

4. A composition as in claim 1 wherein the highly aromatic residue is a thermally cracked residue having a precipitation index of 50 to 90.

5. A composition as in claim 1 wherein the highly aromatic residue is the residue from thermal cracking of catalytically cracked gas oil.

6. A composition as in claim 1 wherein the highly aromatic residue is a high boiling fraction of coking cycle stock.

7. A composition as in claim 1 wherein the highly aromatic residue is residue from pyrolysis of residual petroleum fuel oils used in production of gas.

8. A composition comprising a highly aromatic petroleum residue having a precipitation index between 50 and 90 and 15% to 85% by weight of the combined mixture of a glycidyl polyether of a polyhydric phenol having an epoxy equivalency greater than 1.0 wherein "precipitation index" refers to the volume percent of alpha-methyl naphthalene in solution after titration of a 10% solution of the said petroleum residue in alpha-methyl naphthalene with n-hexadecane until precipitation occurs.

9. A composition for use in making non-skid coatings comprising a mixture of a highly aromatic petroleum residue having a precipitation index between 50 and 90 and a glycidyl polyether of a polyhydric phenol having an epoxy equivalency greater than 1.0 and at least 50% by weight of the combined petroleum residue-polyether mixture of small inert particles wherein "precipitation index" refers to the volume percent of alpha-methyl naphthalene in solution after titration of a 10% solution of the said petroleum residue in alpha-methyl naphthalene with n-hexadecane until precipitation occurs.

10. A composition as in claim 9 wherein the inert material is sand.

11. A process for coating surfaces to improve their wear and solvent resistance which comprises applying to the surface a composition comprising a mixture of a homogeneous single phase highly aromatic petroleum residue having a precipitation index between 50 and 100 and a glycidyl polyether of a polyhydric phenol having an epoxy equivalency greater than one and an epoxy curing agent and then allowing the mixture to stand under the same conditions as during the application until the coating composition becomes hard.

12. A process for treating surfaces to render them non-skid which comprises applying to the surface at a temperature between 20° C. and 150° C. a mixture comprising a homogeneous single phase highly aromatic petroleum residue having a precipitation index between 50 and 100 and a glycidyl polyether of a polyhydric phenol having an epoxy equivalency greater than one, an epoxy curing agent and at least 40% by weight of the mixture of petroleum residue and polyepoxide of small inert sharp particles, and allowing the mixture to stand under the same conditions as during the application until the coating composition becomes hard.

13. A process as in claim 12 wherein the surface is concrete.

14. A process as in claim 12 wherein the surface is asphalt.

15. A process as in claim 12 wherein the surface is steel.

16. A process as in claim 12 wherein the petroleum residue is a high boiling fraction of catalytically cracked gas oil.

17. A process as in claim 12 wherein the epoxy curing agent is a member of the group consisting of acidic and basic materials.

18. A product obtained by the process of claim 11.

References Cited in the file of this patent

UNITED STATES PATENTS 2,528,417    Bradley    Oct. 31, 1950
2,599,817    Evans et al.    June 10, 1952